United States Patent [19]

Holtey et al.

[11] 4,418,384
[45] Nov. 29, 1983

[54] COMMUNICATION SUBSYSTEM WITH AN AUTOMATIC ABORT TRANSMISSION UPON TRANSMIT UNDERRUN

[75] Inventors: Thomas O. Holtey, Newton, Mass.; Richard P. Kelly, Nashua, N.H.; Steven S. Noyes, Boylston; James C. Raymond, Framingham, both of Mass.

[73] Assignee: Honeywell Information Systems Inc., Waltham, Mass.

[21] Appl. No.: 194,655

[22] Filed: Oct. 6, 1980

[51] Int. Cl.³ .................. G06F 3/00; G06F 11/06
[52] U.S. Cl. .................................. 364/200; 371/5
[58] Field of Search ... 364/200 MS File, 900 MS File; 371/5

[56] References Cited

U.S. PATENT DOCUMENTS

| | | | |
|---|---|---|---|
| 3,680,051 | 7/1972 | Blessen et al. | 364/200 |
| 3,710,327 | 1/1973 | Books et al. | 364/200 |
| 3,825,905 | 7/1974 | Allen, Jr. | 364/200 |
| 4,075,691 | 2/1978 | Davis et al. | 364/200 |
| 4,122,519 | 10/1978 | Bielawski et al. | 364/200 |
| 4,155,117 | 5/1979 | Mitchell, Jr. et al. | 364/200 |
| 4,156,931 | 5/1979 | Adelman et al. | 364/900 |
| 4,168,469 | 9/1979 | Parikh et al. | 364/900 |
| 4,188,665 | 2/1980 | Nagel et al. | 364/200 |
| 4,225,919 | 9/1980 | Kyu et al. | 364/200 |
| 4,254,462 | 3/1981 | Raymond et al. | 364/200 |

Primary Examiner—Mark E. Nusbaum
Assistant Examiner—William G. Niessen
Attorney, Agent, or Firm—Nicholas Prasinos

[57] ABSTRACT

A data processing system operating in a bit oriented protocol (BOP) mode of operation senses a transmit underrun; that is, the subsystem is not receiving data from a microprocessor fast enough to maintain the synchronous transmission over the communication line. Apparatus senses the transmit underrun state and generates an abort sequence of bits containing from 8 to 13 successive binary ONE bits.

6 Claims, 4 Drawing Figures

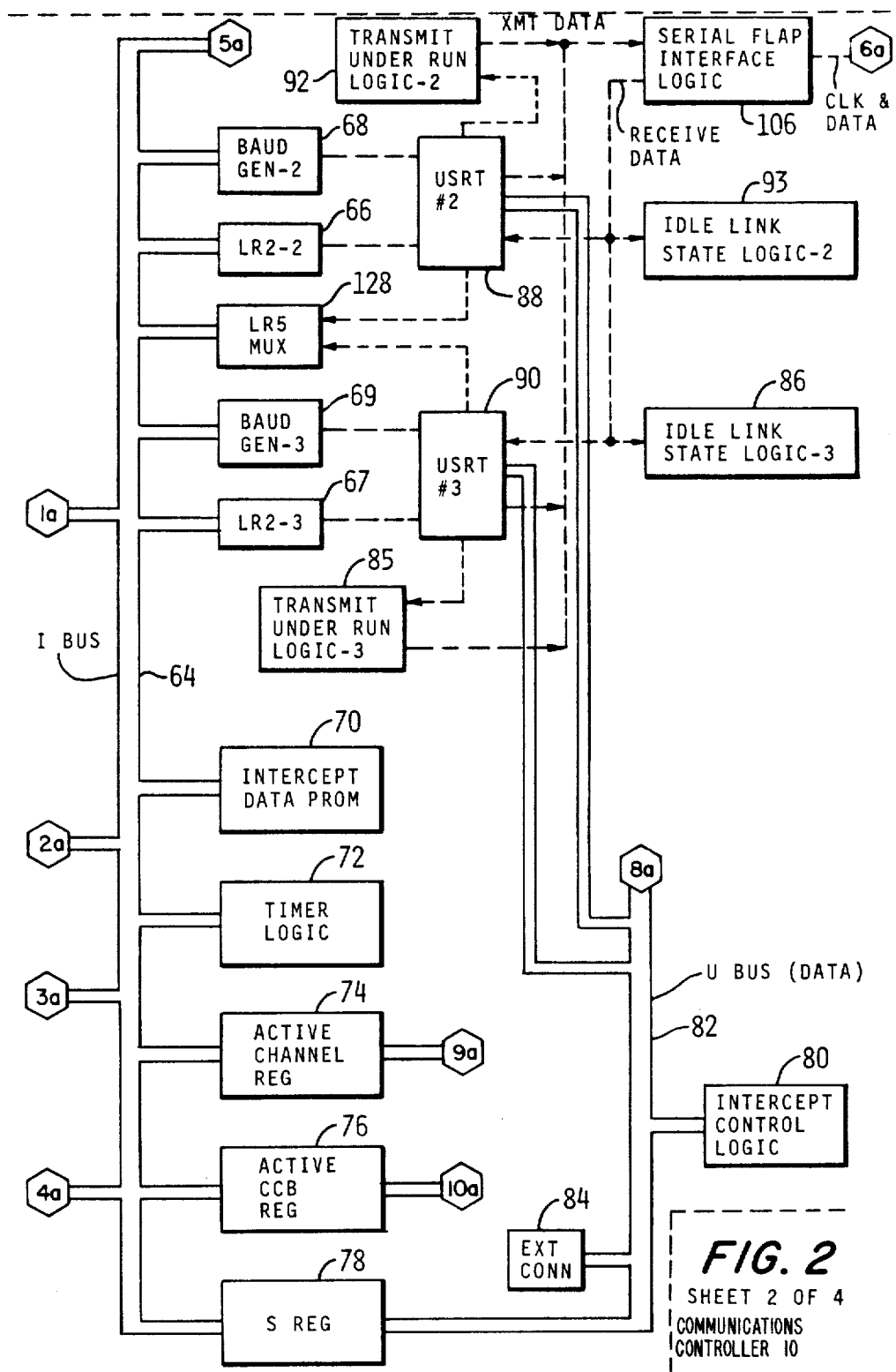

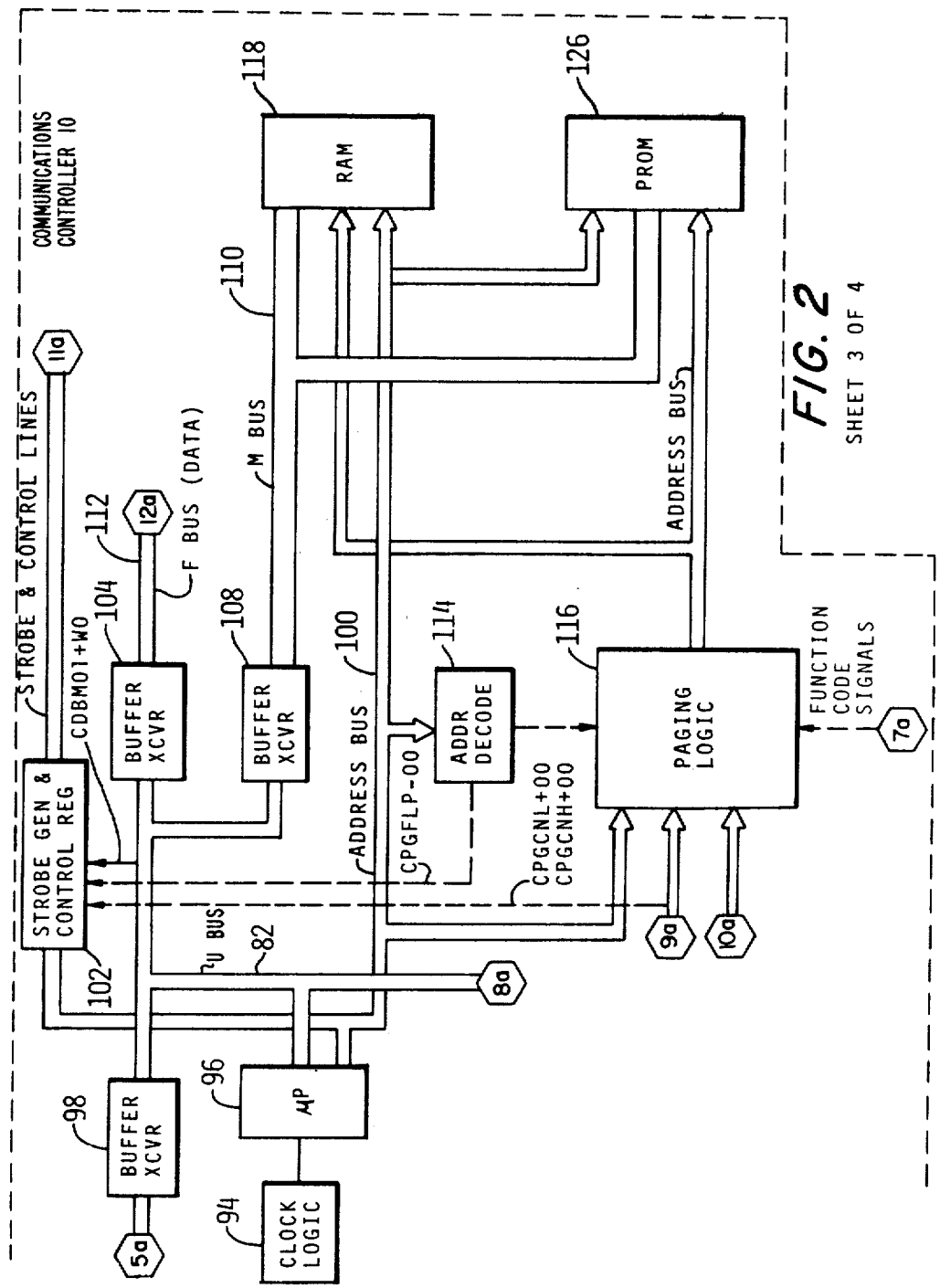

27
COMMUNICATION SUBSYSTEM WITH AN AUTOMATIC ABORT TRANSMISSION UPON TRANSMIT UNDERRUN

BACKGROUND OF THE INVENTION

1. Field of the Invention

The invention relates to data processing systems in general and more particularly to the detection of a transmit underrun state for generating an abort sequence of bits over a communication line in a communications subsystem.

2. Description of the Prior Art

Highly flexible and cost effective communications subsystems have been provided for coupling data processing systems to communication channels such as those associated with a publicly accessible (e.g. telephone) communications network. Such systems have been embodied in hardware/firmware architectures which respond to commands from a communication processor associated with a central processing unit and enter into either a receive mode, a transmit mode, or concurrent transmit/receive modes for transferring data messages between the communication processor and the communication channel. Data transfers occur under a control element acting in concert with a microprocessor within the adapter to assemble and disassemble whole or partial data bytes of varying bit sizes. System architectures which have been used readily accommodate an expansion of capacity and exhibit dynamic flexibility.

However, present communication line adapter systems are not able to provide the control functions required for interfacing with a synchronous communications network such as, for example, has been specified by the International Telegraph and Telephone Consultative Committee (CCITT) and described in the "CCITT Sixth Plenary Assembly-Orange Book, Vol. VIII.2 Public Data Networks", published in 1977 by the International Telecommunication Union, Geneva. Various specifications, in particular those designated X.21, X.24 and X.27, promulgated by the CCITT call for generation within the data network of bit and byte timing signals which are used for establishing a byte control protocol (BCP) or a bit oriented protocol (BOP) for organizing and handling data messages.

In a communication environment such as X.21, it is necessary to use different types of protocols (i.e., byte control protocol and bit oriented protocol) in order to send and/or receive messages with other data communication equipment. During the bit oriented protocol transmission mode, the communications subsystem must receive sufficient data to maintain a continuous stream of data bits over the communication line. If for some reason sufficient data is not provided, then a transmit underrun state is sensed and a series of binary ONE bits indicating an abort is sent over the communication line.

In the Honeywell Level 6/30 System, a microprocessor was designed to send an abort sequence. The microprocessor detected the transmit underrun condition by logic not responding to a data service request in sufficient time to maintain continuous data transmission. The microprocessor generated a single abort sequence.

The microprocessor approach required considerable logic and time consuming firmware and software routines to perform all of the required data communication function.

U.S. patent application Ser. No. 053,111, which was abandoned May 29, 1981 entitled, "Communication Line Adapter for a Bit and Byte Synchronized Data Network" and U.S. Pat. No. 4,254,462 issued Mar. 3, 1981 entitled, "Hardware/Firmware Communication Line Adapter" having the same assignee as the instant application describe such a system whereby the transmit underrun state is processed primarily with firmware/software routines. This generated the problem of restricting the data throughput of the system.

Replacing the microprocessor and its associated logic with the Signetics Multi-Protocol Communications 2652 Circuit reduced the required hardware significantly. However, the use of the 2652 circuit presented problems in several areas of generating an abort sequence in response to a transmit underrun condition. A principle problem was the possibility of sending 16 or more successive binary ONE bits out on the communication line. The receiving device sensed the 16 successive binary ONE bits as indicating that the line was in an idle link state rather than in a transmit underrun state.

It should be understood that the references cited herein are those which the Applicants are aware of, and are presented to acquaint the reader with the level of skill in the art and may not be the closest reference to the invention. No representation is made that any search has been conducted by Applicants.

OBJECTS OF THE INVENTION

It is an object of the present invention to provide an improved communications subsystem.

Another object is to provide a communications subsystem having reduced software and firmware overhead.

A further object is to provide a communications subsystem having reduced cost.

Still a further object is to provide a communications subsystem having improved apparatus for generating an abort signal indicating the transmit underrun status.

SUMMARY OF THE INVENTION

A data processing system includes a communications subsystem for communicating with various devices in a bit oriented protocol mode. The communications subsystem includes a universal synchronous receiver transmitter (USRT) which receives data bytes from a microprocessor. The data bytes are stored in internal registers in the USRT which sends the binary bits of the data byte to the device synchronously in a serial fashion. The USRT indicates to the microprocessor when it requires data bytes. If the microprocessor does not respond with data bytes in a predetermined time, the USRT enters a transmit underrun mode by generating a transmit underrun signal and sending a series of flag bytes (binary 01111110) to the device.

A shift register is responsive to the transmit underrun signal to generate a predetermined signal which is superimposed on the flag byte signals sent to the device.

The device will receive from 8 to 13 binary ONE bits followed by a binary ZERO bit followed by a series of flag bytes. The device recognizes this sequence of signals as a transmit underrun state and takes required action.

DESCRIPTION OF THE PREFERRED EMBODIMENT

Figure 1:
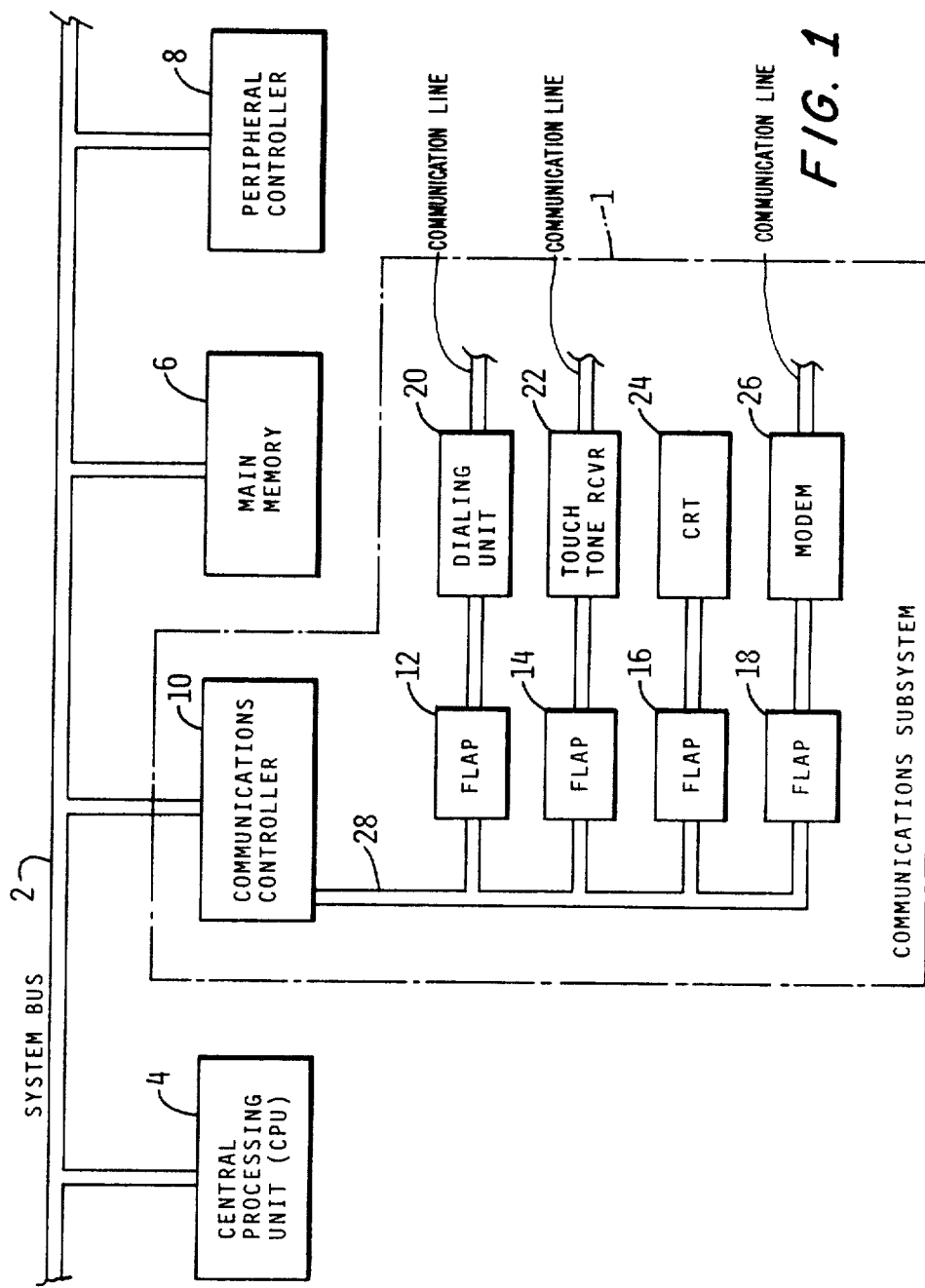
FIG. 1 is a block diagram of the data processing system including the communications subsystem.

FIG. 1 is a block diagram of a typical system. It includes a central processor unit (CPU) 4, a main memory 6, a peripheral controller 8, and a communications controller 10, all coupled in common to a system bus 2. The communications subsystem 1 includes the communications controller 10 and a number of units coupled to the communications controller 10 by a bus 28. This includes a number of flexible line adapter packages (FLAPs) 12, 14, 16 and 18. Coupled to FLAP 12 typically could be a touch-tone receiver 22. Coupled to FLAP 16 typically could be a cathode ray tube (CRT) display 24. Coupled to FLAP 18 typically could be a modem 26.

The communications subsystem 1 receives information from devices, typically the touch-tone receiver 22 and the modem 26, through FLAPs 14 and 18 respectively. The information is transferred over bus 28 to communications controller 10. The information is stored via system bus 2 in main memory 6.

The communications subsystem 1 sends information to devices, typically the dialing unit 20, the CRT 24 and the modem 26. The information is sent to FLAPs 12, 16 and 18 from main memory 6 via communications controller 10 and system bus 2.

The CPU 4 has overall control of the communications subsystem 1 execution and performance. The CPU 4 accomplishes this by transferring configuration and control information via system bus 2 for storage in the communications controller 10. This information includes channel control programs (CCP), communication control blocks (CCB), and line control tables (LCT).

Figure 2:
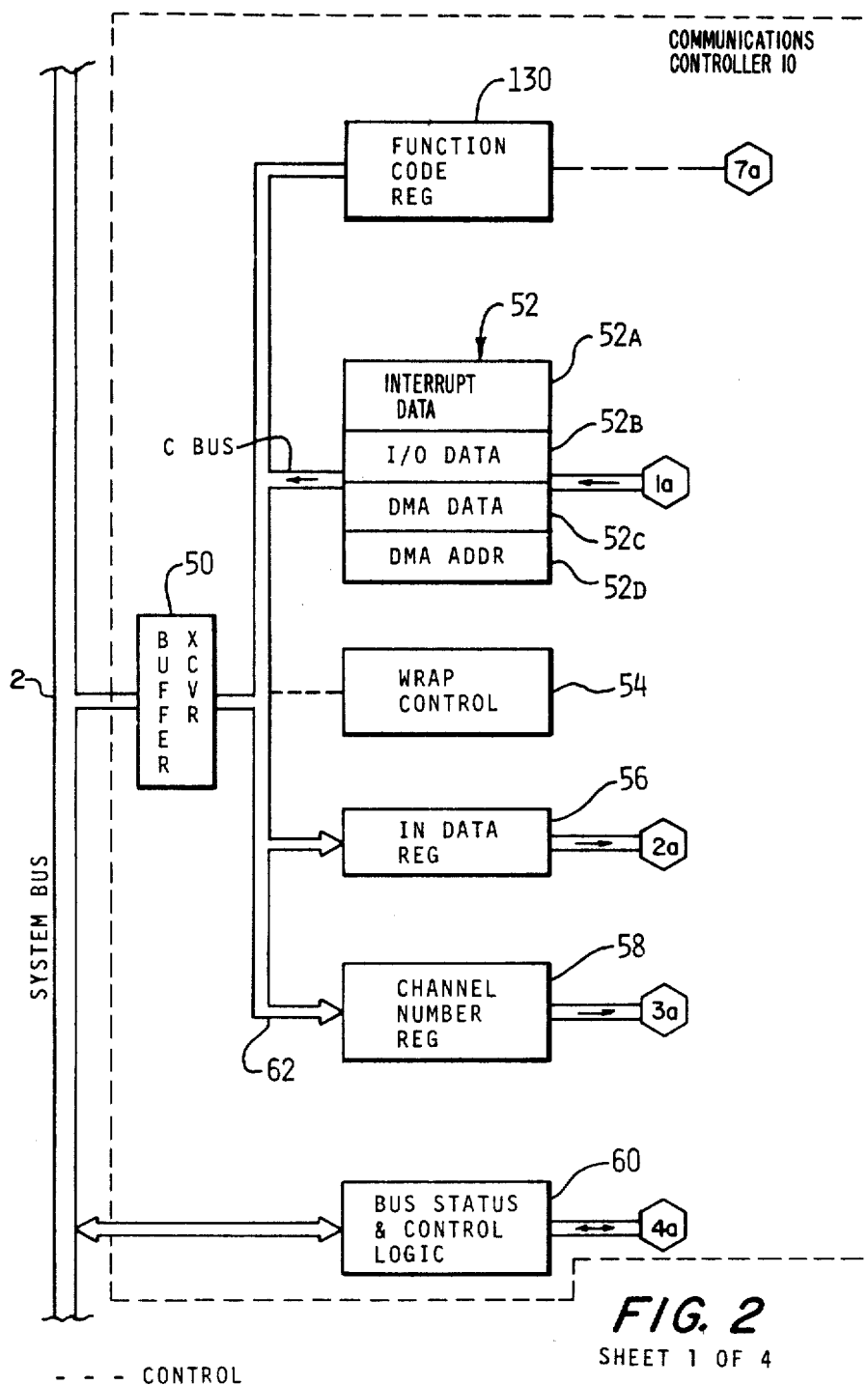
FIG. 2 is a block diagram of the communications subsystem.
Figure 2:
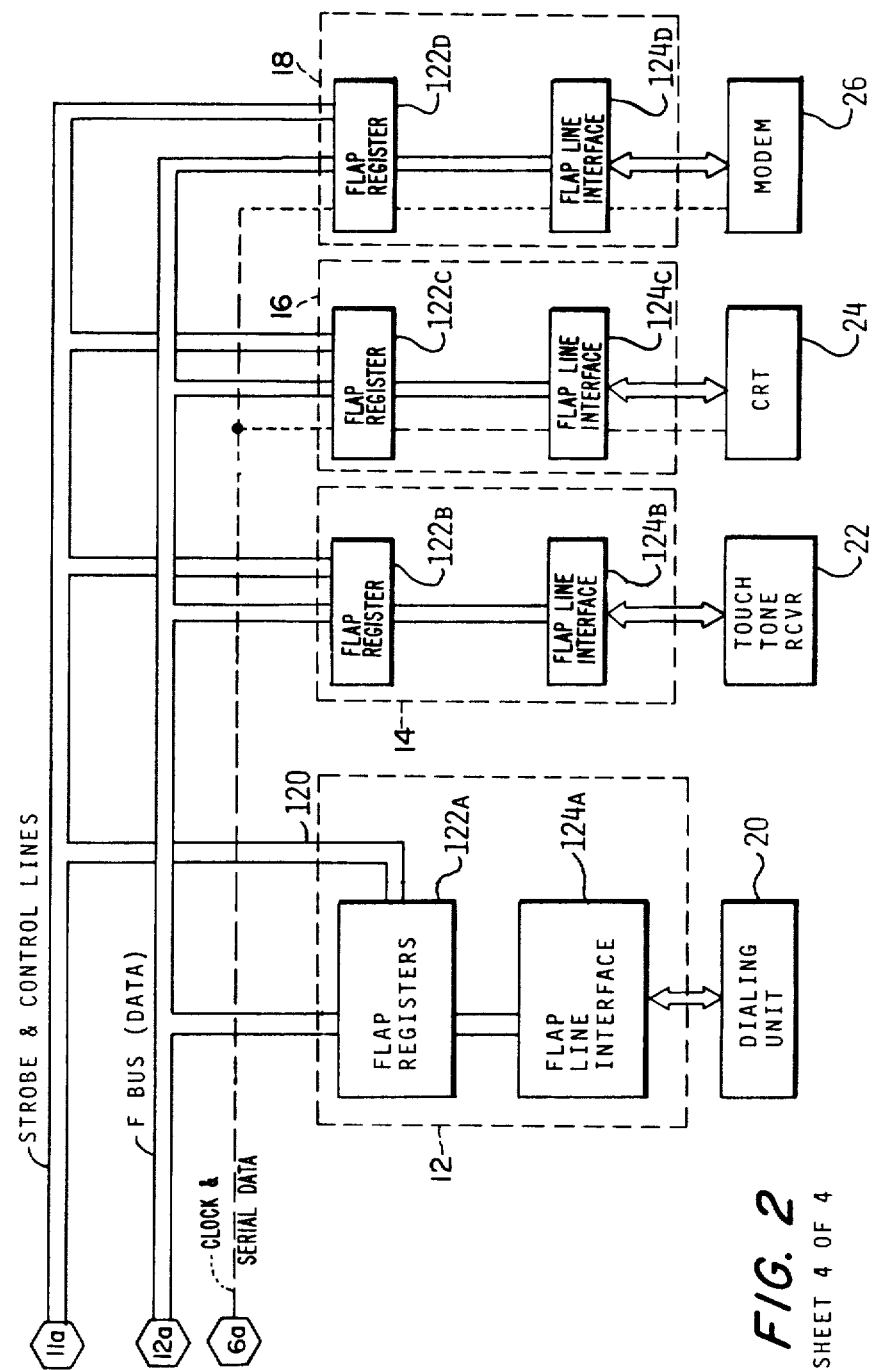

FIG. 2 shows a block diagram of the communications subsystem 1 including the communications controller 10 and the FLAPs 12, 14, 16 and 18. Information is received by communications controller 10 from main memory 6 via system bus 2, a transceiver 50, and C bus 62, and is stored in an in data register 56 under control of bus and status logic 60. Bus and status logic 60 is described in U.S. Pat. No. 4,293,908, which issued Oct. 6, 1981 entitled "Data Processing System Having Direct Memory Access Bus Cycle." Information is transferred to the system bus 2 via a random access memory (RAM) 52, C bus 62 and transceiver 50.

Information may be routed from RAM 52 to in data register 56 since transceiver 50 is capable of isolating the C bus 62 from system bus 2 during a wrap-around operation. The wrap-around operation under control of a wrap control 54 allows information to be transferred between RAM 52 and the registers coupled to the C bus 62. RAM 52 contains four 16-bit registers, an interrupt data register 52a, an input/output data register 52b, a direct memory access (DMA) register 52c and a DMA address register 52d.

The interrupt data register 52a stores the channel number of the CPU 4 and the interrupt level of the information received by the communications subsystem 1 for transfer to main memory 6.

Communications controller 10 transfers information to CPU 4 over system bus 2 by including the CPU 4 channel number with the information.

The input/output data register 52b stores information, status or device identification, in response to a CPU 4 input request. The DMA data register 52c stores the information that is to be written into main memory 6.

The DMA address register 52d stores the main memory 6 address location into which the information stored in DMA data register 52c is to be written. The DMA address register 52d may also store the main memory 6 address location of the information requested by communications controller 10.

A channel number register 58 receives the channel number of all system bus 2 input/output cycles. The bus status and control logic 60 compares the channel number stored in manual switches with the channel number present on the system bus 2. An equal comparison indicates that this system bus 2 cycle is addressing communications subsystem 1. The channel number register 58 is then used to store the channel number present on the system bus 2. A function code register 130 stores the function code received from the system bus 2. The function code indicates to the communications subsystem 1 the input/output function the communications controller is to perform.

A microprocessor 96 controls the operation of the communications controller 10. The microprocessor 96 communicates with the system bus 2 via a U bus 82, a transceiver 98, I bus 64, RAM 52 for sending data to the system bus 2; and in data register 56 for receiving data from the system bus 2, and transceiver 50. Microprocessor 96 generates address signals which are sent over an address bus 100.

Also coupled to U bus 82 are universal synchronous receive/transmit receivers USRT-2 88 and USRT-3 90 communication interfaces. Associated with USRT-2 88 is a baud rate, generator BAUD GEN-2 68 and an LR2-2 register 66. Associated with USRT-3 90 is a baud rate generator BAUD GEN 3 69 and an LR2-3 register 67. BAUD-3 69 and BAUD GEN 3 69 receive signals from I bus 64 to specify the baud rate for the devices directly connected to communications subsystem 1, and also indicates to USRT-2 88 and USRT-3 90 respectively, the baud rate for transmission to an external device.

The LR2-2 register 66 and LR2-3 register 67 store signals from I bus 64 for controlling clear, idle link state, transmit-on, receive-on, and loop modes of USRT-2 88 and USRT-3 90 respectively.

An LR5 multiplexer (MUX) 128 receives output status signals indicating transmit underrun, byte available, status available, and idle link state from USRT-2 88 or USRT-3 90 for transfer to I bus 64.

Intercept data programmable read only memory (PROM) 70 is addressed by channel number signals selecting a particular communication channel in communications subsystem 1 and also addressed by signals indicating that the USRT-2 88 or the USRT-3 90 has generated a data service request. An intercept signal CITCTR from PROM 70 is applied to intercept control logic 80. Microprocessor 96 queries intercept control logic 80 for the intercept signal. Microprocessor 96 is responsive to the intercept signal to receive the remaining PROM 70 signals identifying the interrupting unit for processing the particular communication channel.

A channel register 74 is associated with the paging operation which is described infra. Channel register 74 is loaded by microprocessor 96 through U bus 82, transceiver 98, and I bus 64 with information indicating which communication channel is operative. Signals CPGCNL+00 and CPGCNH+00 are provided to the strobe generator and control register 102 for generating FLAP strobes and storing the direct connect, clear to send and protocol modes of operation.

A random access memory (RAM) 118 stores channel control programs (CCP), communication control blocks (CCB) and line control tables (LCT). This information is loaded into RAM 118 from main memory 6, via system bus 2, transceiver 50, C bus 62, in data register 56, I bus 64, transceiver 98, U bus 82, a transceiver 108, and M bus 110 to RAM 118. This is accomplished by microprocessor 96 generating appropriate address locations which are transferred to RAM 118 via address bus 100 and paging logic 116. The CCP, CCB and LCT operations are described typically in U.S. Pat. No. 4,133,030 entitled "Control System for the Transfer of Data in a Communications Processing System Employing Channel Dedicated Control Blocks".

The communications controller 10 by means of the microprocessor 96 and the strobe generator and control register 102 continually scans the communication lines from FLAPs 12, 14, 16 and 18 for any activity. Upon detection of a receive channel activity, the receive CCP for that channel is initiated. Under CCP control the communications controller 10 received and checks the data byte for correct parity, updates the LCT data transfer and CCB control progress, and delivers the data byte to main memory 6. The CCP terminates after each completed transfer to main memory 4, or when interrupted by a higher priority channel.

The CCB area of RAM 118 provides information on each communication line in a transmit mode and each communication line in a receive mode. The information includes a main memory 6 address location of the next data byte to be stored or read. The information further includes a count of the number of bytes remaining for transfer between the communications controller 10 and main memory 6, and the final status of the communication line. The final status includes error information, data set status (e.g. modem 26), interrupt status, and whether the CCB program has been executed and the status is complete.

The LCT area of RAM 118 stores receive and transmit configuration, context and control information for each communication line. Included are firmware work locations, CCP work locations, receive transmit character length information, a CCP pointer, data byte storage, status information and interrupt level information.

A CCB active register 76 stores information indicating which of the four communication lines is active, and whether the communication line is in a receive or transmit mode. The output of the CCB active register 76 is available to the microprocessor 96 through the paging logic 116.

An S register 78 allows the microprocessor 96 to perform an indirect addressing function by storing an address in the S register 78. This address replaces an address stored in a PROM 126 address location.

PROM 126 stores the firmware routines which are operative with the microprocessor 96. Address information is sent from microprocessor 96 to PROM 126 via address bus 100 and paging logic 116. A microword read from PROM 126 is sent back to the microprocessor 96 via the M bus 110, transceiver 108 and U bus 82.

The microprocessor 96 communicates with the CPU 4 and the main memory 6 over system bus 2 as well as the USRT-2 88 and USRT-3 90 through the firmware routines stored in PROM 126 and the software channel program routines stored in RAM 118.

It is necessary to match the speed of microprocessor 96 with the speed of the logic and memory units. This is accomplished through a clock logic 94 unit. The microprocessor 96 normally runs at a 500 nanosecond or two megahertz clock rate. However, when the microprocessor 96 communicates with the USRT-2 88 and USRT-3 90 or FLAP 122a, 122b, 122c or 122d logic, the clock logic 94 phase 1 and phase 2 timing signals are slowed to a 1600 nanosecond or 0.625 megahertz clock rate. The clock logic 94 outputs a number of clock phase signals in each microprocessor 96 phase 1 and phase 2 cycles. The phase 1 and phase 2 cycles are slowed to enable additional clock phase signals to control the FLAP 122 a-d logic.

When USRT-2 88 is in a transmit (bit oriented protocol) mode, and the next data byte is not provided to the USRT-2 88 in time to provide a continuous stream of bits to the receiving station, then a transmit underrun unit 92 conditions the USRT-2 88 to transmit a series of binary ONEs indicating to the receiving station that the message was aborted. The data bytes are sent to a device via serial FLAP interface logic 106 and a FLAP line interface 124c or 124d.

An idle link state unit 93 is also coupled to the USRT-2 88. When the USRT-2 88 is in a receive (bit oriented protocol) mode, the sending station places the line in an idle state by sending 15 binary ONE bits on the line. The idle link state unit 93 detects the 15 binary ONE bits and informs the microprocessor 96 that the line is in an idle link state via LR5 MUX 128. The microprocessor 96 responds to the 15 successive binary ONE bits to abort the message sent by the sending station and look for a new message.

A transmit underrun unit 85 and an idle link state unit 86 are coupled to USRT-3 90 to perform the transmit underrun operation and receive idle link state operation for that communication channel. The idle link state operation is described in U.S. patent application Ser. No. 194,698 filed Oct. 6, 1980, entitled "A Communication Subsystem Idle Link State Detector".

An address decode unit 114 receives address signals from the microprocessor 96 via address bus 100 and generates control signals which perform a number of functions, typically activating the stretch cycle of clock logic 94, enabling certain registers to store information from the various buses, enabling a strobe generator and control register logic 102 by means of signal CPGFLP-00, and enabling USRT-2 88 and USRT-3 90.

The strobe generator and control register logic 102 is responsive to address signals received over address bus 100 for generating separate strobe signals for FLAP registers 122a, 122b, 122c and 122d as well as control signals which are enabled at the respective FLAP registers 122a-d by the particular strobe signal. Stored are bits indicating the direct connect, clear to send and protocol modes of operation and described in U.S. patent application Ser. No. 194,311 filed Oct. 6, 1980, entitled "A Communications Subsystem Having a Self-Latching Data Monitor and Storage Device".

An external connector 84 is provided for testing purposes. It allows test equipment to be connected to U bus 82 to exercise the communications controller 10 through firmware test routines applied externally. PROM 126 may be disabled for certain test sequences.

A paging logic 116 unit in conjunction with the channel register 74 and the CCB active register 76 allows the microprocessor 96 to be operative with the eight communication channels using a single firmware set of routines. Associated with each communication channel is a block of CCB software. The paging logic allows the same set of firmware routines to process each CCB program. Similarly, the LCTs are organized by communication lines. The paging logic 116 allows a single firmware routine to be operative with each communication line.

Data is transferred between the U bus 82 and the FLAPs 122a-d via F bus 112 and a transceiver 104.

The FLAP registers 122a-d are operative with the FLAP line interface receivers and drivers 124a, 124b, 124c and 124d for communication with devices 20, 22, 24 and 26 respectively.

Figure 3:
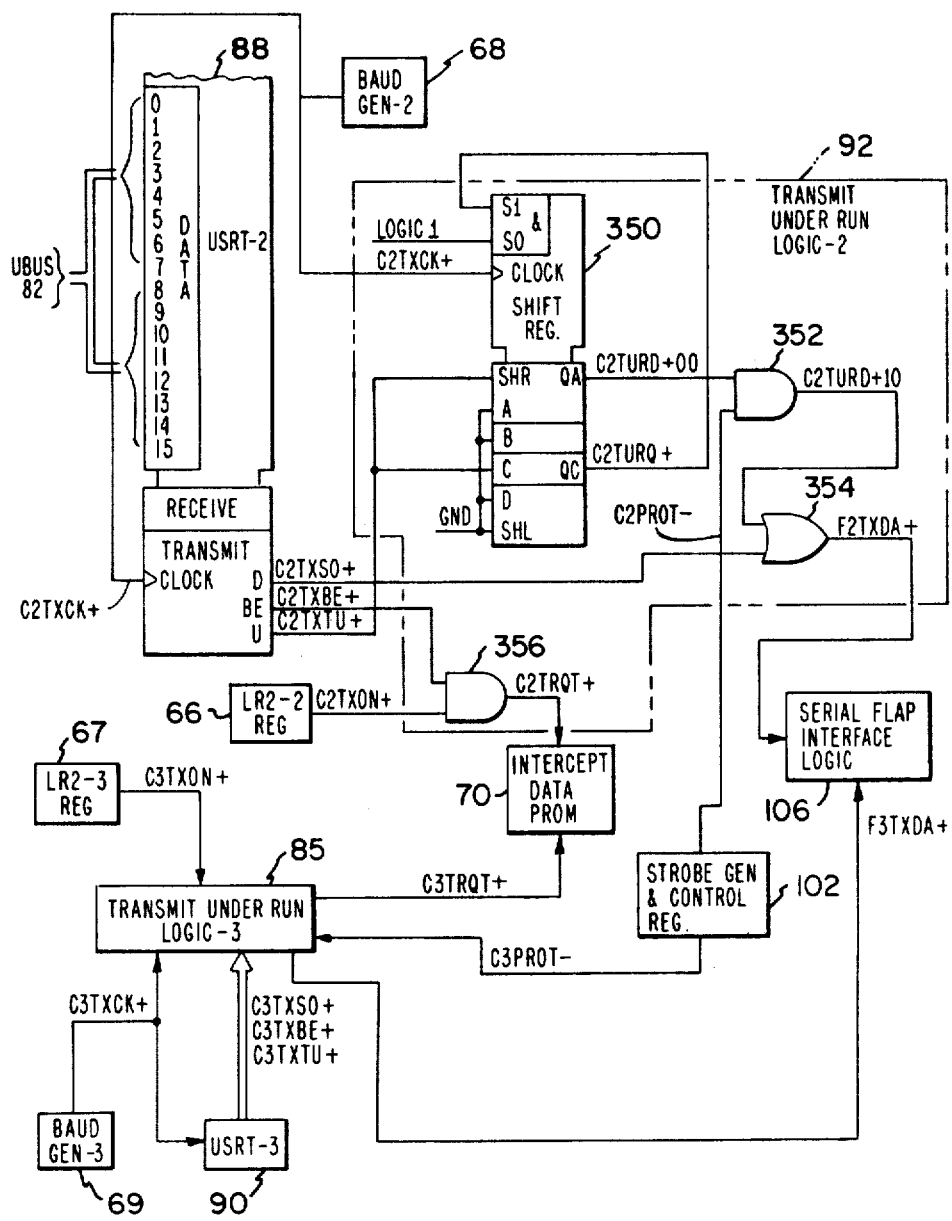
FIG. 3 is a detailed logic diagram of the transmit underrun logic.
Figure 4:
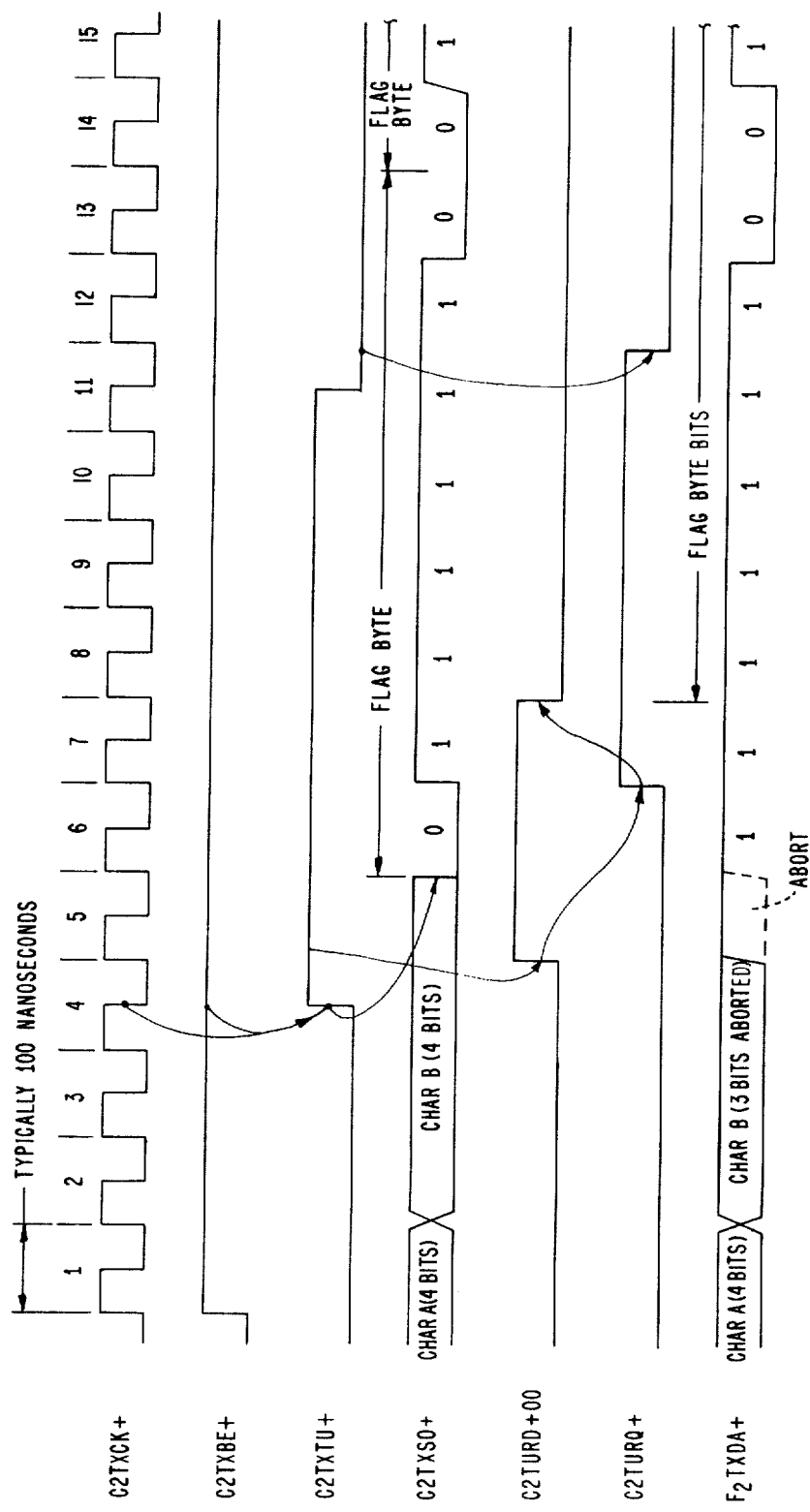
FIG. 4 is a timing diagram of the logic for generating the abort bits.

Referring to FIGS. 3 and 4, the baud generator-2 68 generates a clock signal C2TXCK+, typically a 100 nanosecond cycle time, which is applied to the USRT-2 88 transmitter clock terminal and a shift register 350 clock terminal. The USRT-2 88 transmits a continuous stream of data bits over a data signal line C2TXSO+ through an OR gate 354, over a data signal line F2TXDA+ and to serial FLAP interface logic 106 at the bit rate specified by the C2TXCK+ clock signal.

Data is received by the USRT-2 88 over U bus 82. The USRT-2 88 stores the data received in internal buffers. It is essential for the USRT-2 88 to receive data from U bus 82 in time to maintain the synchronous stream of data bits over data signal line C2TXS0+. Therefore, if the transmit data status register internal to the USRT-2 88 is empty, then a buffer empty signal C2TXBE+ is forced to logical ONE on the rise of the first C2TXCK+ signal as shown in FIG. 4. Signal C2TXBE+ and the transmission on control signal C2TXON+ from the LR2-2 register 66 are applied to an AND gate 356. The signal C2TRQT+ at logical ONE requests data from microprocessor 96. If data is not received by USRT-2 88 by the fourth C2TXCK clock signal, than a transmit underrun signal C2TXTU is forced to logical ONE on the fall of the C2TXCK clock signal.

The transmit underrun operation is active during the bit oriented protocol (BOP) mode of operation. During the BOP mode, a continuous stream of data bits is sent from the USRT-2 88 to a receiver via the serial FLAP interface logic 106. If a sufficient amount of data is not supplied to the USRT-2 88 in time to maintain the continuous transmit data stream, then flag signals and an abort signal are sent out on data signal line F2TXDA+ to inform the receiving station that the transmission of data is broken. When the receiving station receives the abort signal and the flag signals, the receiving station takes appropriate action such as to request a retransmission of the data or to abort the transmission.

The transmit underrun signal C2TXTU+ is applied to the shift right input terminal of shift register 350 which forces a QA output signal C2TURD+00 to logical ONE on the rise of the fifth C2TXCK+ clock pulse. A C2PROT− signal from the strobe generator and control register 102 at logical ONE indicates a BOP mode. The C2TURD+00 and C2PROT− signals applied to an AND gate 352 force the data signal line F2TXDA+ to logical ONE via OR gate 354.

In FIG. 4, four bit characters A and B are transmitted from the USRT-2 88 over data signal line C2TXS0+. When signal C2TXTU+ is forced high, the USRT sends a series of flat bytes (binary 01111110) over data signal line C2TXS0+ starting at the rise of the sixth C2TXCK+ clock signal. However, signal C2TURD+00 at logical ONE forces the last bit of character B and the first bit of the flag byte to logical ONE on data signal line F2TXDA+.

In FIG. 3, shift register 350 signal C2TURQ+ is forced to logical ONE on the rise of the seventh clock pulse. This forces the GND signal applied to input terminals A, B and D to be loaded into shift register 350 forcing signal C2TURD+00 to logical ZERO, thereby forcing signal C2TURD+10, the output of AND gate 352, to logical ZERO. This enables the flag byte data bits on data signal C2TXS0+ through OR gate 354. The transmit underrun signal C2TXTU+ is forced to logical ZERO by the internal USRT-2 88 logic on the fall of the eleventh C2TXCK+ clock signal, which forces signal C2TURQ+ to logical ZERO on the rise of the twelfth C2TXCK+ clock signal.

In FIG. 4, the four bits of character A and the four bit bits of character B appear serially on data signal line C2TXSO+, followed by the bits of the flag bytes. Signal C2TURD+00 forced to logical ONE on the rise of the C2TXCK+ clock signal overrides the fourth character B bit as well as the first binary ZERO flag bit of the first flag byte on data signal line F2TXDA+.

Transmit underrun logic-3 85 is associated with USRT-3 90 which provides signals C3TXSO+, C3TXBE+, and C3TXTU+. The LR2-3 register 67 provides the C3TXON+ signal. Baud generator-3 69 provides the C3TXCK+ clock signal. The intercept data PROM 70 receives the C3TRQT+ request signal and the strobe generator and control register 102 provides the C3PROT− BOP protocol signal. Data to the serial FLAP interface logic 106 is sent via data signal line F3TXDA+. The signals associated with the transmit underrun logic-3 85 and USRT-3 90 operate in a similar fashion to their transmit underrun logic-2 92 and USRT-2 88 counterparts.

The microprocessor 96 is a Motorola 6800 circuit described in "Basic Microprocessors and the 6800" by Ron Bishop, published by Hayden Book Co., Inc. of Rochelle Park, N.J.

The USRT-2 88 circuit is a Signetics 2652 Multi-Protocol Communications circuit described in the "Signetics Bipolar/MOS Microprocessor Data Manual", Copyright 1977 by Signetics Corporation, 811 East Arques Avenue, Sunnyvale, Calif. 94086.

The shift register 350 is a 74 LS 194 circuit as described in "The TTL Data Book for Design Engineers", Second Edition, published by Texas Instruments.

Having shown and described a preferred embodiment of the invention, those skilled in the art will realize that many variations and modifications may be made to affect the described invention and still be within the scope of the claimed invention. Thus, many of the elements will provide the same results and fall within the spirit of the claimed invention. It is the invention, therefore, to limit the invention only as indicated by the scope of the claims.

What is claimed is:

1. In combination with a data processing system comprising a system bus, at least one central processing unit (CPU), one main memory, one peripheral controller, each individually coupled to said system bus, a communications subsystem also coupled to said system bus, said communications subsystem including a communications controller coupled to said system bus and also including typical communication devices such as a modem, a dialing unit and a touch-tone receiver coupled to said communications controller, said communications controller controlling the receipt and transmission of messages by said data processing system, said communications controller comprising:
(a) a microprocessor coupled to main memory for receiving a data byte of information from said main memory;
(b) a universal synchronous receiver transmitter (USRT) coupled to said microprocessor for receiving the data byte of information from said microprocessor, said USRT further generating an underrun signal and a series of flag byte signals when said microprocessor fails to transmit a data byte to said USRT within a predetermined time interval; and
(c) first means responsive to said underrun signal for generating a predetermined signal and superimposing the predetermined signal on one of the series of flag byte signals thereby generating an abort sequence of a predetermined number of binary ONE bits.

2. The communications controller as recited in claim 1 including at least a first register in said USRT for storing the data byte received from said microprocessor and transmitting the data byte serially to a selected on of said communication devices.

3. The communications controller as recited in claim 2 wherein said first means includes a shift register coupled to said USRT and responsive to the underrun signal for generating the predetermined signal.

4. The communications controller as recited in claim 3 wherein said first means includes second means coupled to said USRT and said shift register for superimposing the predetermined signal on the flag byte signal.

5. The communications controller as recited in claim 4 wherein said second means comprises an AND gate having its input terminal coupled to said shift register, and an OR gate coupled to said AND gate and to said USRT.

6. The communications controller as recited in claim 5 wherein said predetermined number of successive binary ONE bits is from 8 to 13.

* * * * *